United States Patent
Grigsby et al.

(10) Patent No.: US 9,197,920 B2
(45) Date of Patent: Nov. 24, 2015

(54) SHARED MEDIA EXPERIENCE DISTRIBUTION AND PLAYBACK

(75) Inventors: Travis M. Grigsby, Austin, TX (US);
James A. Kahle, Austin, TX (US);
Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 12/903,840

(22) Filed: Oct. 13, 2010

(65) Prior Publication Data

US 2012/0096084 A1 Apr. 19, 2012

(51) Int. Cl.
| | |
|---|---|
| G06F 15/16 | (2006.01) |
| H04N 21/422 | (2011.01) |
| G06Q 50/00 | (2012.01) |
| H04N 21/4788 | (2011.01) |
| H04N 21/43 | (2011.01) |
| H04N 21/45 | (2011.01) |
| H04N 21/462 | (2011.01) |
| H04N 21/81 | (2011.01) |
| H04N 21/441 | (2011.01) |

(52) U.S. Cl.
CPC ......... *H04N 21/42203* (2013.01); *G06Q 50/01* (2013.01); *H04N 21/4307* (2013.01); *H04N 21/4532* (2013.01); *H04N 21/4622* (2013.01); *H04N 21/4788* (2013.01); *H04N 21/8106* (2013.01); *H04N 21/441* (2013.01)

(58) Field of Classification Search
USPC .......................................................... 709/204
See application file for complete search history.

(56) References Cited

U.S. PATENT DOCUMENTS

| | | | | |
|---|---|---|---|---|
| 6,816,904 | B1 * | 11/2004 | Ludwig et al. | 709/226 |
| 2008/0162665 | A1 * | 7/2008 | Kali | 709/217 |
| 2009/0164902 | A1 * | 6/2009 | Cohen et al. | 715/716 |
| 2009/0232129 | A1 * | 9/2009 | Wong et al. | 370/352 |
| 2010/0082135 | A1 * | 4/2010 | Amidon et al. | 700/94 |
| 2010/0211199 | A1 * | 8/2010 | Naik et al. | 700/94 |

* cited by examiner

*Primary Examiner* — Wing F Chan
*Assistant Examiner* — Andrew Woo
(74) *Attorney, Agent, or Firm* — Steven M. Greenberg, Esq.; CRGO Law

(57) ABSTRACT

Embodiments of the present invention provide a method, system and computer program product for providing a shared user experience during media playback. In an embodiment of the invention, a method for providing a shared user experience during media playback is provided. The method includes selecting for a particular user a media file for playback in a media player executing in memory by a processor of a computer. The method also includes retrieving a shared user experience audio file recorded for a different user during a previous playback of the selected media file. Finally, the method includes playing back for the particular user both the selected media file and the retrieved shared user experience audio file concurrently in the media player.

18 Claims, 2 Drawing Sheets

SHARED MEDIA EXPERIENCE DISTRIBUTION AND PLAYBACK

BACKGROUND OF THE INVENTION

1. Field of the Invention

The present invention relates to media playback and more particularly to media playback synchronization amongst different viewers.

2. Description of the Related Art

Media playback refers to the loading and playback of pre-generated content such as audio, video or audio-visual materials. Media players are common to all commercial operating systems and in most cases, are included as a feature of the operating system free of charge. More sophisticated media players are distributed separately and can handle many different media formats and provide many enhanced features. The ubiquity of the world wide web (the "Web") has further advanced media distribution to the extent that Web browsers and even modern television sets include functionality for Internet access and Web access therethrough in order to stream media content from the Web directly to the television set.

Even still, the ability for an end user to stream media on demand has not resulted in the end of public performance of media. In particular, movie theaters remain crammed with people on weekends and musical concerts are as popular as ever. Academically, it is believed that people choose to watch media in public places or with other people despite the convenience of the instantaneous streaming of media over the Internet because of the so-called shared user experience. The shared user experience refers to the environment created by the collective viewing of media. For instance, in the context of a movie theater, the audible reaction of the audience to a scene of a movie, whether the reaction is laughter or a scream contributes to the shared experience of watching a film in public. Likewise, the roar of the crowd in watching a sporting or musical event remains part and parcel of the spectator experience separate and apart from the individualistic experience of viewing a sporting or musical event alone on television or on a computer.

Advancements in broadband communications have permitted the use of new technologies in the field of remote common experiences. Online meeting applications, for example, allow different participants to the meeting, each remotely disposed from the other, to commonly view present content in real time. While the content in many cases is a presentation, or a document, other content such as rich media such as audio and video can be shared. The shared user experience thus exists at some level in an online meeting to the extent that different participants to the meeting can audibly or visually sense the reaction of the other participants in real time in response to the presentation of content. Notwithstanding, the shared user experience remains elusive when viewing content alone outside of the real time online meeting.

BRIEF SUMMARY OF THE INVENTION

Embodiments of the present invention address deficiencies of the art in respect to media playback and provide a novel and non-obvious method, system and computer program product for providing a shared user experience during media playback. In an embodiment of the invention, a method for providing a shared user experience during media playback is provided. The method includes selecting for a particular user a media file for playback in a media player executing in memory by a processor of a computer. The method also includes retrieving a shared user experience audio file recorded for a different user during a previous playback of the selected media file. Finally, the method includes playing back for the particular user both the selected media file and the retrieved shared user experience audio file concurrently in the media player.

In one aspect of the embodiment, the method additionally includes modifying the retrieved shared user experience according to an identity of the particular user. For instance, in an aspect of the embodiment, modifying the retrieved shared user experience according to an identity of the particular user, includes muting at least a portion the retrieved shared user experience according to an identity of the particular user. In another aspect of the embodiment, modifying the retrieved shared user experience according to an identity of the particular user, includes reducing a volume of at least a portion the retrieved shared user experience according to an identity of the particular user.

In another embodiment of the invention, a media playback data processing system is provided. The system includes a computer with at least one processor and memory. The system also includes a shared user experience aggregation module coupled to a media player executing in the computer. The shared user experience aggregation module includes program code executing in the computer and enabled to select for a particular user a media file for playback in the media player, such as a video file, an audio file or an audio-visual file, to retrieve a shared user experience audio file recorded for a different user during a previous playback of the selected media file, and to direct play back in the media player for the particular user both the selected media file and the retrieved shared user experience audio file concurrently in the media player.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for providing a shared user experience during media playback. In accordance with an embodiment of the invention, audio feedback during playback by different users of a media file can be captured and reduced to individual digital audio files. For instance, the media file can be a video, audio, or an audio-visual presentation. Subsequently, during playback of the media file for a different user, selected ones of the digital audio files can be aggregated and played back to the different user in concert with the playback of the media file in order to provide an environment of a shared user experience.

Figure 1:
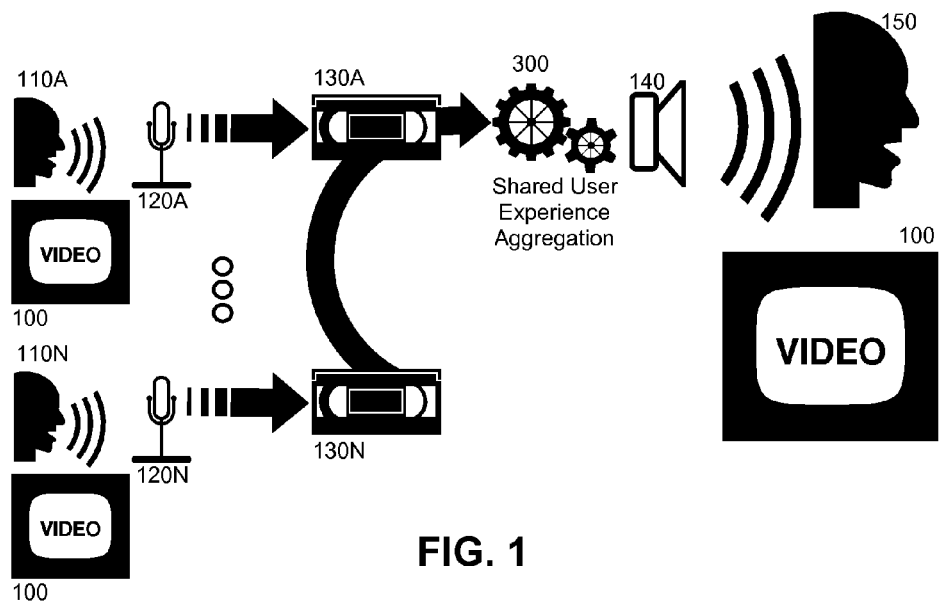
FIG. 1 is a pictorial illustration of a process for providing a shared user experience during media playback.

In further illustration, FIG. 1 pictorially shows a process for providing a shared user experience during media playback. As shown in FIG. 1, audio feedback 120A can be captured for users 110A, 110N during playback of a media file 100. The audio feedback 120A can be reduced to separate shared user experience audio files 130A, 130N for users 110A, 110N. Subsequently, shared user experience aggregation processor 300 can aggregate different ones of the shared user experience audio files 130A, 130N for playback 140 to a different user 150 during playback of the media file 100. In this way, the different user 150 can experience the audio feedback 120A of selected ones of the users 110A, 110N during playback of the media file 100 even though the playback of the media file 100 occurs at a time later than when the audio feedback 120A had been captured thereby providing a shared user experience to the different user 150.

Figure 2:
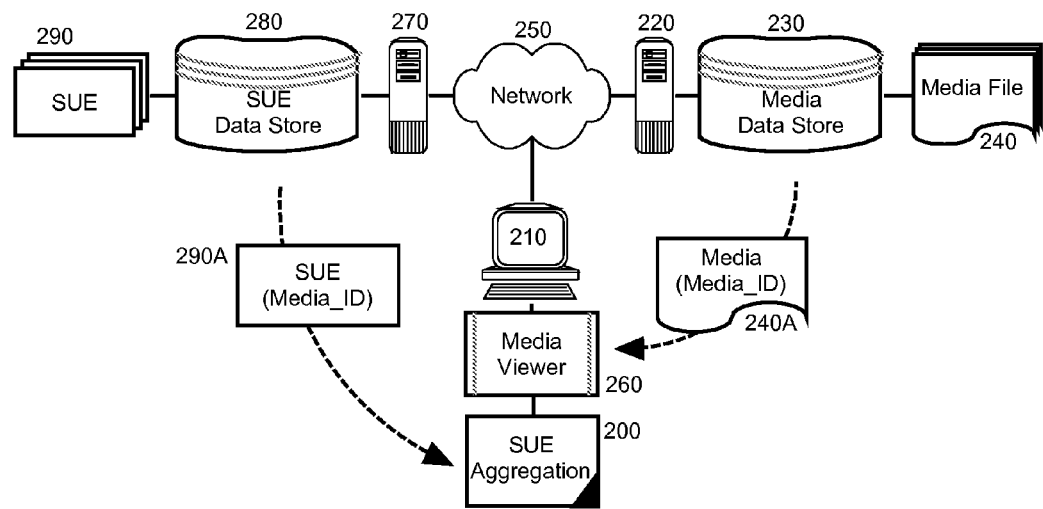
FIG. 2 is a schematic illustration of a media playback data processing system configured for providing a shared user experience during media playback.

The process described in connection with FIG. 1 can be implemented in a media playback data processing system. In further illustration, FIG. 2 schematically shows a media playback data processing system configured for providing a shared user experience during media playback. The system can include a computer 210 with at least one processor and memory configured for communicative coupling to host servers 220, 270 over computer communications network 250. Host server 220 can include a media data store 230 of different media files 240. Host server 280 can include a shared user experience data store 280 of different shared user experience audio files 290. Each of the shared user experience audio files 290 can include captured audio of one or more persons audibly reacting to the contemporaneous playback of a corresponding one of the media files 240. As such, each of the shared user experience audio files 290 can be associated with an identifier for a corresponding one of the media files 240.

In operation, a media viewer 260 executing in the computer 210 can load a media file 240A from amongst the media files 240A. In this regard, the media file 240A can be loaded from local or remote storage, or streamed in real time from the host server 220. Shared user experience aggregation module 200 coupled to the media viewer 260 can identify the media file 240A and retrieve one or more shared user experience audio files 290A from the shared user experience data store 280 corresponding to one or more other users. For example, the shared user experience audio files 290A can be selected as corresponding to other users in a 'buddy list' or 'friend list', or other users whom are geographically proximate, presently available, or simply present in a table of related users. Thereafter, the shared user experience audio files 290A can be synchronized in playback with the playback of the media file 240A by the media viewer in order to provide a shared user experience during the playback of the media file 240A.

Figure 3:
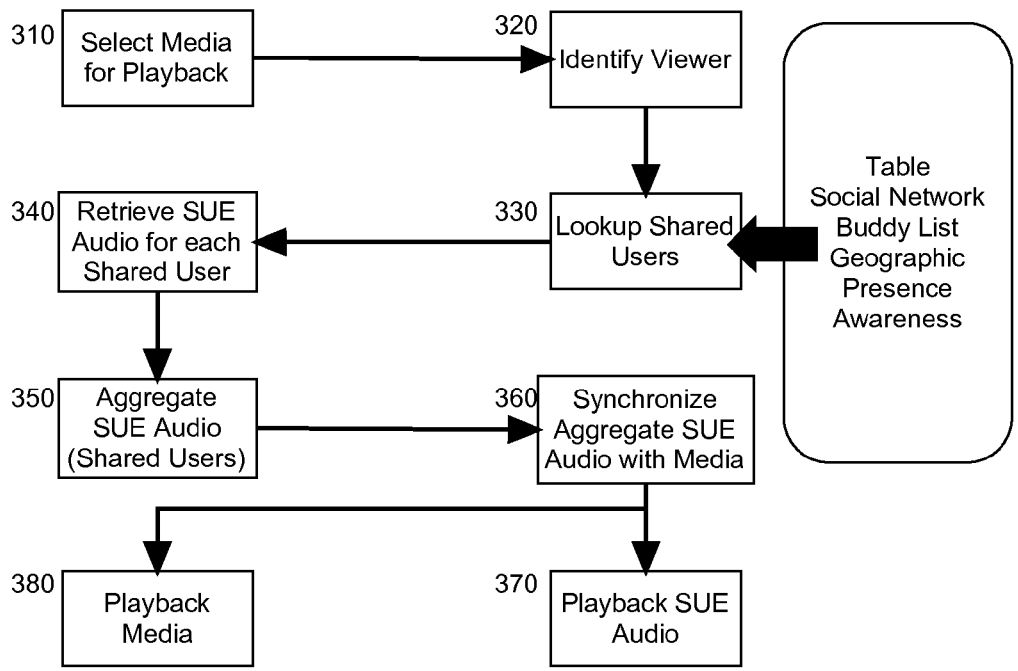
FIG. 3 is a flow chart illustrating a process for providing a shared user experience during media playback; and, FIG. 4 is a flow chart illustrating a process for modifying shared user experience audio according to a viewer filter during media playback.

In yet further illustration, FIG. 3 is a flow chart depicting a process for providing a shared user experience during media playback. Beginning in block 310, a media file can be selected for playback by a user. The media file can include, by way of example, a video file, an audio file or an audio-visual file such as a presentation. In block 320, the user can be identified and in block 330, one or more shared users can be determined for the identified user. In this regard, the shared users can be determined by reference to a table correlating users within one another, by reference to the social network of the identified user, by reference to a buddy list of the user, by reference to geographically proximate other users, or by those users presently available online as determined by presence awareness functionality.

In block 340, a shared user experience audio file can be retrieved for each determined shared user. Thereafter, in block 350, the retrieved audio files can be aggregated into a single shared user experience audio file for the determined users and in block 360, playback of the single shared user experience audio file can be synchronized with the media file selected for playback. Finally, in block 380 the media file can be played back in synchronization with the single shared user experience audio file in block 370.

Figure 4:
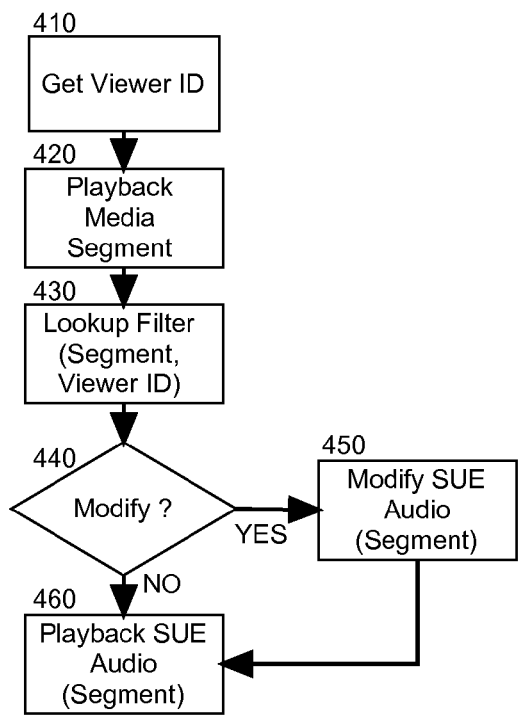

Optionally, the determination of whether or not playback a portion of the single shared user experience audio file can be filtered according to the identity of the user. In even yet further illustration, FIG. 4 is a flow chart illustrating a process for modifying shared user experience audio according to a viewer filter during media playback. Beginning in block 410, the identity of a user experiencing play back of a media file can be obtained and in block 420, a segment of the media file can be played back. In block 430, a filter can be retrieved for the segment and in block 440, based upon the filter it can be determined whether or not to modify play back a corresponding segment of the single shared user experience audio file. If so, in block 450, play back of the single shared user experience audio file can be modified, for example the play back of the single shared user experience audio file can be muted or de-emphasized. Finally, in block 460, the modified single shared user experience audio file can be played back for the segment of the media file.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for providing a shared user experience during media playback comprising:
    selecting for a particular user a media file for playback in a media player executing in memory by a processor of a computer;
    retrieving multiple shared user experience audio files each recorded for a different user during a previous playback of the selected media file and each having recorded thereon audio feedback of audio generated by and captured for a different user during a previous playback of the selected media file;
    aggregating the retrieved multiple shared user experience audio files into a single shared user experience audio file for playback concurrently with playback; and,
    playing back for the particular user both the selected media file and the retrieved shared user experience audio file concurrently in the media player.

2. The method of claim 1, further comprising modifying the retrieved shared user experience according to an identity of the particular user.

3. The method of claim 2, wherein modifying the retrieved shared user experience according to an identity of the particular user, comprises muting at least a portion the retrieved shared user experience according to an identity of the particular user.

4. The method of claim 2, wherein modifying the retrieved shared user experience according to an identity of the particular user, comprises reducing a volume of at least a portion the retrieved shared user experience according to an identity of the particular user.

5. The method of claim 1, wherein retrieving a shared user experience audio file recorded for a different user during a previous playback of the selected media file, comprises:
   determining a different user associated with the particular user in respect to a social network; and,
   retrieving a shared user experience audio file recorded for a different user during a previous playback of the selected media file.

6. The method of claim 1, wherein retrieving a shared user experience audio file recorded for a different user during a previous playback of the selected media file, comprises:
   determining a different user associated with the particular user in respect to a buddy list; and,
   retrieving a shared user experience audio file recorded for a different user during a previous playback of the selected media file.

7. The method of claim 1, wherein retrieving a shared user experience audio file recorded for a different user during a previous playback of the selected media file, comprises:
   determining a different user associated with the particular user in respect to geographic proximity; and,
   retrieving a shared user experience audio file recorded for a different user during a previous playback of the selected media file.

8. A media playback data processing system comprising:
   a computer with at least one processor and memory; and,
   a shared user experience aggregation module coupled to a media player executing in the computer, the shared user experience aggregation module comprising program code executing in the computer and enabled to select for a particular user a media file for playback in the media player, to retrieve multiple shared user experience audio files each recorded for a different user during a previous playback of the selected media file and each having recorded thereon audio feedback of audio generated by and captured for a different user during a previous playback of the selected media file and to aggregate the retrieved multiple shared user experience audio files into a single shared user experience audio file for playback concurrently with playback of the media file, and to direct play back in the media player for the particular user both the selected media file and the retrieved shared user experience audio file concurrently in the media player.

9. The system of claim 8, wherein the media file comprises a video file.

10. The system of claim 8, wherein the media file comprises an audio file.

11. The system of claim 8, wherein the media file comprises an audio-visual file.

12. A computer program product for providing a shared user experience during media playback, the computer program product comprising:
   a computer readable storage medium comprising a storage device having computer readable program code embodied therewith, the computer readable program code comprising:
   computer readable program code for selecting for a particular user a media file for playback in a media player executing in memory by a processor of a computer;
   computer readable program code for retrieving multiple shared user experience audio files each recorded for a different user during a previous playback of the selected media file and each having recorded thereon audio feedback of audio generated by and captured for a different user during a previous playback of the selected media file and aggregating the retrieved multiple shared user experience audio files into a single shared user experience audio file for playback concurrently with playback of the media file; and,
   computer readable program code for playing back for the particular user both the selected media file and the retrieved shared user experience audio file concurrently in the media player.

13. The computer program product of claim 12, further comprising computer readable program code for modifying the retrieved shared user experience according to an identity of the particular user.

14. The computer program product of claim 13, wherein the computer readable program code for modifying the retrieved shared user experience according to an identity of the particular user, comprises computer readable program code for muting at least a portion the retrieved shared user experience according to an identity of the particular user.

15. The computer program product of claim 13, wherein the computer readable program code for modifying the retrieved shared user experience according to an identity of the particular user, comprises computer readable program code for reducing a volume of at least a portion the retrieved shared user experience according to an identity of the particular user.

16. The computer program product of claim 12, wherein the computer readable program code for retrieving a shared user experience audio file recorded for a different user during a previous playback of the selected media file, comprises:
   computer readable program code for determining a different user associated with the particular user in respect to a social network; and,
   computer readable program code for retrieving a shared user experience audio file recorded for a different user during a previous playback of the selected media file.

17. The computer program product of claim 12, wherein the computer readable program code for retrieving a shared user experience audio file recorded for a different user during a previous playback of the selected media file, comprises:
   computer readable program code for determining a different user associated with the particular user in respect to a buddy list; and,
   computer readable program code for retrieving a shared user experience audio file recorded for a different user during a previous playback of the selected media file.

18. The computer program product of claim 12, wherein the computer readable program code for retrieving a shared user experience audio file recorded for a different user during a previous playback of the selected media file, comprises:
   computer readable program code for determining a different user associated with the particular user in respect to geographic proximity; and,
   computer readable program code for retrieving a shared user experience audio file recorded for a different user during a previous playback of the selected media file.

* * * * *